United States Patent [19]
Olson et al.

[11] Patent Number: 5,803,476
[45] Date of Patent: Sep. 8, 1998

[54] COMPOSITE BICYCLE FRAME AND METHOD OF MANUFACTURING

[75] Inventors: Steven H. Olson, Corona; James S. Busby, Costa Mesa; Stanley A. Needle, Irvine, all of Calif.

[73] Assignee: GT Bicycles, Inc., Santa Ana, Calif.

[21] Appl. No.: 519,568

[22] Filed: Aug. 25, 1995

[51] Int. Cl.⁶ ................................................. B62D 3/04
[52] U.S. Cl. ........................ 280/281.1; 264/258; 264/314
[58] Field of Search ............................... 280/288.3, 274, 280/281.1, 288.1, 284; 264/257, 258, 279, 314, 317, 315, 316, 319

[56] References Cited

U.S. PATENT DOCUMENTS

| | | | |
|---|---|---|---|
| 439,095 | 10/1890 | Becker | 280/261 |
| 578,615 | 3/1897 | Travis | 280/284 |
| 606,323 | 6/1898 | Wronski | 280/276 |
| 657,667 | 9/1900 | Mills | 280/284 |
| 944,795 | 12/1909 | Leet et al. | 280/284 |
| 1,047,430 | 12/1912 | Michaelson | 280/284 |
| 1,257,761 | 2/1918 | Strand | 280/284 |
| 1,298,958 | 4/1919 | Johnston | 280/284 |
| 1,412,012 | 4/1922 | Bruno | 280/284 |
| 1,594,079 | 7/1926 | Tanner | 280/276 |
| 3,833,242 | 9/1974 | Thompson, Jr. | 280/281.1 |
| 3,917,313 | 11/1975 | Smith et al. | 280/284 |
| 4,322,088 | 3/1982 | Miyakoshi et al. | 280/284 |
| 4,506,755 | 3/1985 | Tsuchida et al. | 180/227 |
| 4,529,056 | 7/1985 | Kreuz | 180/227 |
| 4,673,053 | 6/1987 | Tanaka et al. | 180/227 |
| 4,789,174 | 12/1988 | Lawwill | 280/284 |
| 4,828,781 | 5/1989 | Duplessis et al. | 264/257 X |
| 4,850,607 | 7/1989 | Trimble | 280/281.1 |
| 4,889,355 | 12/1989 | Trimble | 280/281.1 |
| 4,902,458 | 2/1990 | Trimble | 280/281.1 X |
| 4,951,791 | 8/1990 | Belil Creixell | 180/219 |

(List continued on next page.)

FOREIGN PATENT DOCUMENTS

| | | | |
|---|---|---|---|
| 3033294 | 4/1981 | Germany | 280/285 |
| 428442 | 12/1947 | Italy | 280/285 |
| 220760 | 8/1924 | United Kingdom . | |

OTHER PUBLICATIONS

1992 Cannondale Spec—Suspension Mountain Bicycles–Article–10 pgs.
TREK 9000 Series Spec="This Beauty Is A Beast"–Article–8 pgs.
Fisher RS–1—Article–4 pgs.—Mountain Bike Action/Mar. '92.
Suspension Mania Strikes Cycling—Mountain Bike Action/Feb. '92 3 pgs.
Boulder Intrepid Al—2 pgs.—Mountain Bike Action/Mar. '92.
Team Shockblok—6 pgs.—Mountain Bike Action/Jul. '92.

(List continued on next page.)

Primary Examiner—Kevin Hurley
Attorney, Agent, or Firm—Stetina Brunda Garred & Brucker

[57] ABSTRACT

A bicycle frame has a seat tube fitting to which a seat is attachable, a head tube fitting to which forks are attachable, and a bottom bracket fitting to which a crank shaft is attachable. A single frame tube of fiber reinforced polymer composite interconnects the seat tube fitting, head tube fitting, and bottom bracket fitting in a manner which provides a lightweight, and durable bicycle frame. The single frame tube is formed by disposing the seat tube fitting, head tube fitting, and bottom bracket fitting within a first mold section, then disposing a bladder covered with polymer impregnated fiber within the first mold section such that the bladder passes through openings in the seat tube fitting, head tube fitting, and bottom bracket fitting. The bladder is then inflated while the polymer impregnated fiber is heated so as to form a fiber reinforced polymer composite which conforms to the shape of the cavity formed within the mold, thereby defining the desired bicycle frame.

19 Claims, 5 Drawing Sheets

5,803,476
Page 2

U.S. PATENT DOCUMENTS

| | | | |
|---|---|---|---|
| 4,986,949 | 1/1991 | Trimble | 264/258 |
| 4,997,197 | 3/1991 | Shultz | 280/275 |
| 5,098,114 | 3/1992 | Jones | 280/284 |
| 5,121,937 | 6/1992 | Lawwill | 280/284 |
| 5,158,733 | 10/1992 | Trimble | 264/258 |
| 5,205,572 | 4/1993 | Buell et al. | 280/284 |
| 5,215,322 | 6/1993 | Enders | 280/281.1 X |
| 5,244,224 | 9/1993 | Busby | 280/284 |
| 5,259,637 | 11/1993 | Busby | 280/284 |
| 5,269,551 | 12/1993 | Martin et al. | 280/281.1 |
| 5,273,303 | 12/1993 | Hornzee-Jones | 280/288.3 |
| 5,368,804 | 11/1994 | Hwang et al. | 280/281.1 X |
| 5,456,481 | 10/1995 | Allsop et al. | 280/281.1 |
| 5,464,240 | 11/1995 | Robinson et al. | 280/281.1 X |

OTHER PUBLICATIONS

Mountain Bike Action, Oct. 1992, pp. 10, 25–26, 28–29, 31, 36–37, 39–41, 44–45, 47, 58, 70, 73, 76, 79, 123, and 130.

Bicycling, Nov. 1992, pp. 26–27, 58, 63–64, and 105.

Mountain Biking, Nov. 1992, vol. 6, No. 11. pp. 6–9, 25, 48–49, 65, 71, 73, 108–109, 115, 124, 129, 140, 143, 163, and 169.

Mountain Biking, Dec. '92, pp. 1–2, 5, 18, 44–49, 77, 127, and 160.

Mountain Biking, Jan. '93, vol. 7, No. 1, pp. 32–33, 40, 45, 71, 75, 82–83, 115, and 117.

Welcome to the Next Generation . . . —9 pgs.–Mountain Bike–Jun. '92.

Schwinn S.A.S.S.–7 pgs.–Mountain Bike Action–May '92.

Offroad Pro–Flex 550—3 pgs.—Offroad.

If the Best Motorcycle . . . "Litespeed Suspension", Mountain Bike–Jul. '9 8 pgs.

Slingshot—Mountain & City Biking, 6 pgs.

Guide to Suspension and High Performance, vol. 3, 1992, pp. 9, 13–15, 17, 30–31, 36–37, 42–45, 47, 53, 60, 69, 71, 76, 85–87, 92, 96, 98, 100, 108–112, 117 and 119.

COMPOSITE BICYCLE FRAME AND METHOD OF MANUFACTURING

FIELD OF THE INVENTION

The present invention relates generally to bicycles and particularly to a bicycle frame comprising a single frame tube of fiber reinforced polymer composite to which a lightweight metal seat tube fitting, head tube fitting, and bottom bracket fitting are attached. Such construction provides a frame which is lightweight, durable, and which substantially reduces fabrication and finishing costs.

BACKGROUND OF THE INVENTION

The fabrication of bicycle frames utilizing fiber reinforced polymer composites is well known. For example, the use of thermoset composites to fabricate unitary construction bicycle frames is disclosed in U.S. Pat. No. 4,850,607 and U.S. Pat. No. 4,889,355. These two United States patents describe the fabrication of unitary construction bicycle frames utilizing a resin impregnated fibrous material such as glass, KEVLAR or carbon fiber. According to contemporary fabrication methodology, such composite bicycle frames are constructed by first preforming the elongate composite members thereof, and then interconnecting these members with composite joints.

For example, a frame may be fabricated by first forming a separate crossbar, down tube, and seat tube of fiber reinforced polymer composite and then placing the crossbar, down tube, and seat tube in a common fixture, so as to maintain their desired relative orientations while they are connected to one another by forming interconnecting joints therebetween with additional fiber reinforced polymer composite material.

As will be appreciated by those skilled in the art, although such contemporary methodology provides a bicycle frame which is lightweight and durable, such contemporary methodology is extremely time consuming and expensive. Each of the interconnecting joints must be individually fabricated by hand. Further, such contemporary fabrication methodology requires extensive hand finishing such that a desirable smooth surface is provided.

Thus, although the prior art has recognized, to a limited extent, the benefits of providing a lightweight and durable bicycle frame, the proposed solutions have, to date, been ineffective in providing a satisfactory remedy. In view of the foregoing, it is desirable to provide a method for fabricating a composite bicycle frame which is lightweight and durable, wherein the method minimizes the manual operations involved in the practice thereof, and consequently facilitates the manufacture of a bicycle frame at a substantially reduced cost. As such, it is desirable to minimize or eliminate the steps required for providing interconnection of the frame members and for providing a desirable finish, so as to substantially reduce the amount of labor involved in the fabrication process.

SUMMARY OF THE INVENTION

The present invention specifically addresses and alleviates the above-mentioned deficiencies associated with the prior art. More particularly, the present invention comprises a lightweight and durable bicycle frame comprising a seat tube fitting to which a seat is attachable, a head tube fitting to which forks are attachable, a bottom bracket fitting to which a crank is attachable, and a single frame tube of fiber reinforced polymer composite to which the seat tube fitting, the head tube fitting, and the bottom bracket fitting are all attached.

The bicycle frame may either be configured as a hard tail, i.e., lacking a shock absorber on the rear wheel, or a soft tail, i.e., having a shock absorber on the rear wheel, as desired. Thus, to define a soft tail frame, the single frame tube defines a cross bar, a down tube, and a seat tube. The seat stay(s) and chain stay(s) are attached thereto utilizing a shock absorber or motion damper according to well known methodology. To define a hard tail, the single frame tube defines a cross bar, a down tube, a chain stay member, and a seat stay member.

As used herein, the term seat tube is defined to include a generally elongate structural member extending from proximate the seat to proximate the crank, regardless of whether or not the seat stem actually passes therethrough. Thus, the seat stem may either pass through the seat tube itself, or through a separate tube mounted proximate thereto and generally parallel therewith.

The seat tube fitting, the head tube fitting, and the bottom bracket fitting are formed of a lightweight and durable metal, such as aluminum, magnesium, or titanium, so as to provide the additional structural strength necessary for the attachment of the seat, forks, and crank to the single frame tube of the frame. The seat tube fitting is configured such that the seat is slidably attachable thereto, the head tube fitting is configured such that the forks are rotatably attachable thereto, and the bottom bracket fitting is configured such that the crankshaft is rotatably attachable thereto.

The seat tube fitting, head tube fitting, and bottom bracket fitting may be removably attachable or permanently attached to the single frame tube which generally defines the frame. Alternatively, they may be integrally formed therewith. Thus, the seat tube fitting, head tube fitting, and bottom bracket fitting may be attached to the single frame tube after forming of the single frame tube. As those skilled in the art will appreciate, various construction and fasteners may be utilized to facilitate such removable attachment of the seat tube fitting, head tube fitting, and bottom bracket fitting to the single frame tube.

For example, the seat tube fitting, head tube fitting, and bottom bracket fitting may be configured as two-piece members which are bolted together so as to clampably capture a portion of the single frame tube between the two sections thereof. Alternatively, various other clamping and/or fastening arrangements may be utilize to attach the seat tube fitting, head tube fitting, and bottom bracket fitting to the single frame tube.

The seat tube fitting, head tube fitting, and bottom bracket fitting may alternatively be permanently attached to the preformed single frame tube via adhesive bonding. As those skilled in the art will appreciate, other forms of permanent attachment are likewise suitable. For example, additional fiber reinforced polymer composite may be applied to the single frame tube and the seat tube fitting, head tube fitting, and/or bottom bracket fitting so as to facilitate such permanent attachment.

The single frame tube is preferably comprised of a fiber reinforced thermoplastic composite, preferably carbon-fiber reinforced polymer composite. The polymer may comprise either a thermoset polymer or a thermoplastic polymer, as desired. The single frame tube preferably comprises fiber reinforced polymer composite comprising a continuous wrapped sheet of fiber material. The fiber material preferably comprises a woven fiber material. The single frame tube preferably further comprises an outer layer of nylon which is preferably formed by wrapping the fiber reinforced polymer material which covers a bladder with nylon sheet or tape, as described below.

More particularly, forming of the single frame tube without an integrally formed seat tube fitting, head tube fitting, and bottom bracket fitting is accomplished by disposing an elongate tubular bladder covered with polymer impregnated fiber into a first mold section, mating the first mold section to a second mold section such that a cavity generally defining the desired frame shape is defined by the first and second mold sections, applying heat to the polymer impregnated fiber, and inflating the bladder so as to cause the resulting fiber reinforced polymer composite to generally conform to the shape of the cavity. If it is desirable to integrally form the seat tube fitting, head tube fitting, and bottom bracket fitting to the single frame tube, then the seat tube fitting, head tube fitting, and bottom bracket fitting are disposed within the first mold section prior to disposing the bladder therein. After the seat tube fitting, head tube fitting, and bottom bracket fitting have been placed into the first mold section, then the bladder covered with polymer impregnated fiber is placed into the first mold section by snaking or threading the bladder through the seat tube fitting, head tube fitting, and bottom bracket fitting. Thus, when the second mold section is mated to the first mold section, heat is applied thereto, and the bladder is pressurized, then the fiber reinforced polymer composite is caused to conform to the shape of the cavity so as to define a unitary construction bicycle frame. During this conforming process, the fiber reinforced polymer composite bonds to the seat tube fitting, head tube fitting, and bottom bracket fitting and also forms a flush surface with the outer surfaces thereof in a manner which minimizes or eliminates the need for surface finishing of the frame after it has cooled and been removed from the mold.

The bladder is preferably covered with polymer impregnated fiber by wrapping the elongate tubular bladder with sheet or tape woven fiber which has been impregnated with polymer. Preferably, a singular, continuous section of such impregnated fiber is utilized, so as to enhance the strength of the bicycle frame. Further, according to the preferred embodiment of the present invention a layer of nylon, preferably comprising nylon sheet or tape is wrapped over the polymer impregnated fiber so as to further enhance the surface finish of the bicycle frame. The use of such a nylon outer layer provides a smooth and glossy surface finish which is substantially transparent and thus allows the woven fiber material disposed therebelow in the single frame tube to be seen, thus enhancing the aesthetic appeal thereof.

Thus, according to the present invention, the substantial manual effort required to finish the bicycle frame is reduced or eliminated. In the present invention, the elongate tubular portions of the frame, e.g., the cross bar, the down tube, and the seat tube, are interconnected to one another with joints having smooth and continuous surfaces such that further finishing thereof is not required. As such, the molding process of the present invention provides a frame which has a desired surface finish, thereby substantially reducing the cost of fabrication.

Thus, according to the methodology of the present invention, a composite bicycle frame is fabricated by forming a single frame tube of fiber reinforced polymer composite such that a bicycle frame is generally defined thereby, and attaching a seat tube fitting, a head tube fitting, and a bottom bracket fitting to the single frame tube.

The seat tube fitting, head tube fitting, and bottom bracket fitting may either be formed to the single frame tube during the forming thereof, or may be attached to the single frame tube subsequent to the forming thereof.

These, as well as other advantages of the present invention will be more apparent from the following description and drawings. It is understood that changes in the specific structure shown and described may be made within the scope of the claims without departing from the spirit of the invention.

DETAILED DESCRIPTION OF THE PREFERRED EMBODIMENT

The detailed description set forth below in connection with the appended drawings is intended as a description of the presently preferred embodiment of the invention, and is not intended to represent the only form in which the present invention may be constructed or utilized. The description sets forth the functions and the sequence of steps for constructing and operating the invention in connection with the illustrated embodiment. It is to be understood, however, that the same or equivalent functions and sequences may be accomplished by different embodiments that are also intended to be encompassed within the spirit and scope of the invention.

The bicycle frame of the present invention is illustrated in FIGS. 1–15 which depict a presently preferred embodiment of the invention and a method for making the same.

Referring now to FIGS. 1–9, the bicycle frame 10 is comprised generally of a cross bar 12, a down tube 14, and a seat tube 16 which are formed from a single frame tube 11 of fiber reinforced polymer composite in a manner which provides a lightweight, high strength bicycle frame. A seat tube fitting 18 is formed to the single frame tube 11, so as to accommodate the slidable attachment of a seat (not shown) thereto. Similarly, a head tube fitting 20 is formed to the single frame tube 11 in a manner which facilitates rotatable attachment of forks (not shown) thereto, and similarly, a bottom bracket fitting 22 is formed to the single frame tube 11 in a manner which facilitates rotatable attachment of a crank (not shown) thereto. The seat tube fitting 18, the head tube fitting 20, and the bottom bracket fitting 22 are all preferably formed of a lightweight, durable metal such as aluminum, magnesium, and/or titanium.

According to the preferred embodiment of the present invention, the single frame tube 11 of fiber reinforced polymer composite is thus formed to define a head bend 24 where the cross bar 12 and the down tube 14 meet, a bottom joint 26 where the down tube 14, the seat tube 16 meet, and a seat tube bend 28 where the seat tube 16 and the cross bar 12 meet. Thus, a generally triangular bicycle frame 10 is defined by the cross bar 12, down tube 14, and seat tube 16. Further, according to the preferred embodiment of the present invention, the head bend 24 and the seat bend 28 are actually bends in the single frame tube 11, whereas the bottom joint 26 is a joint formed by the two ends of the single frame tube 11. As those skilled in the art will appreciate, the joint formed by the two ends of the single frame tube 11 may alternatively be formed at either the seat tube fitting 18 or the head tube fitting 20, rather than at the bottom bracket fitting 22.

Figures 1, 2:
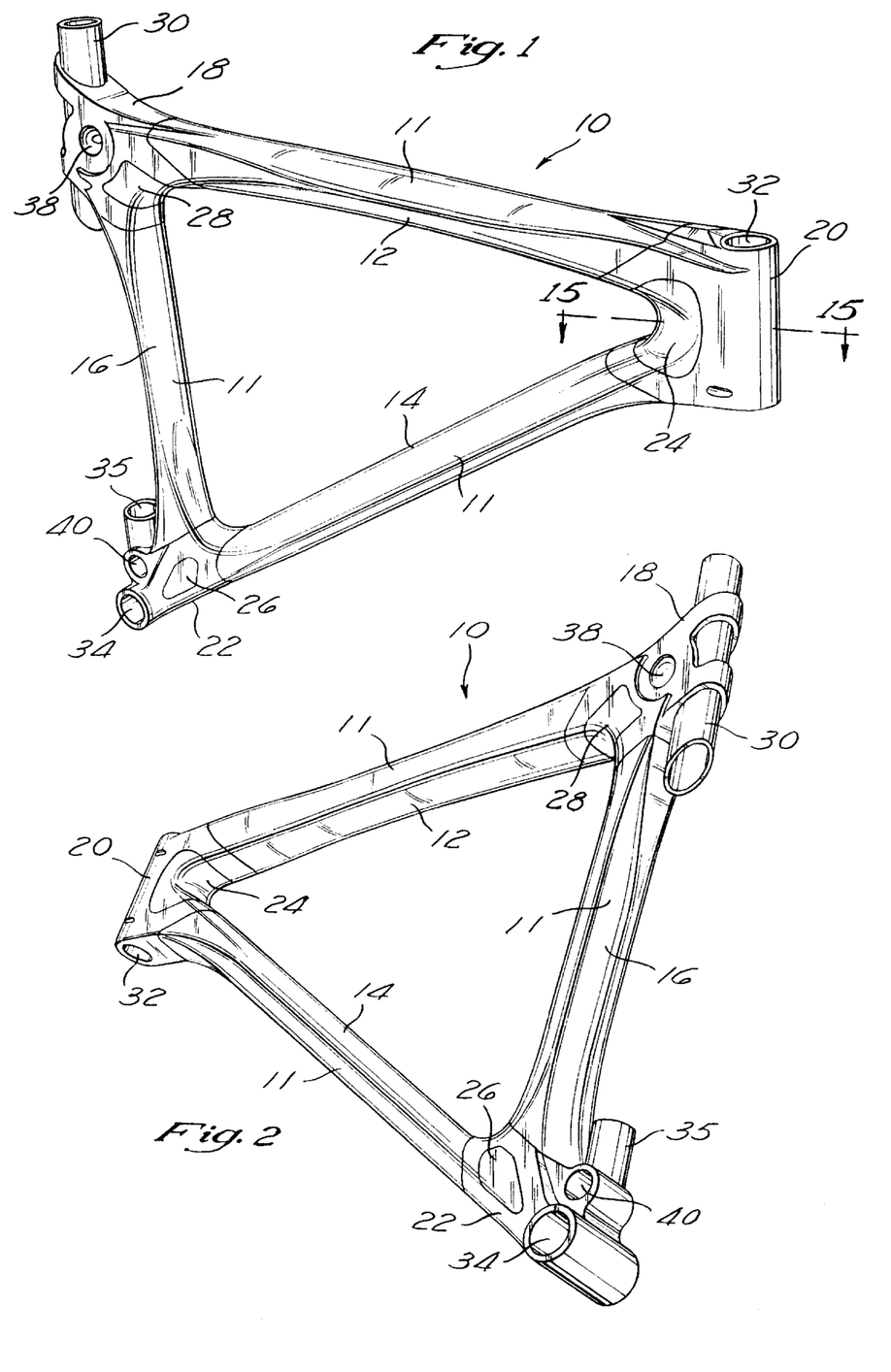
FIG. 1 is a front perspective view of the composite bicycle frame of the present invention.
FIG. 2 is a rear perspective view thereof.
Figure 3:
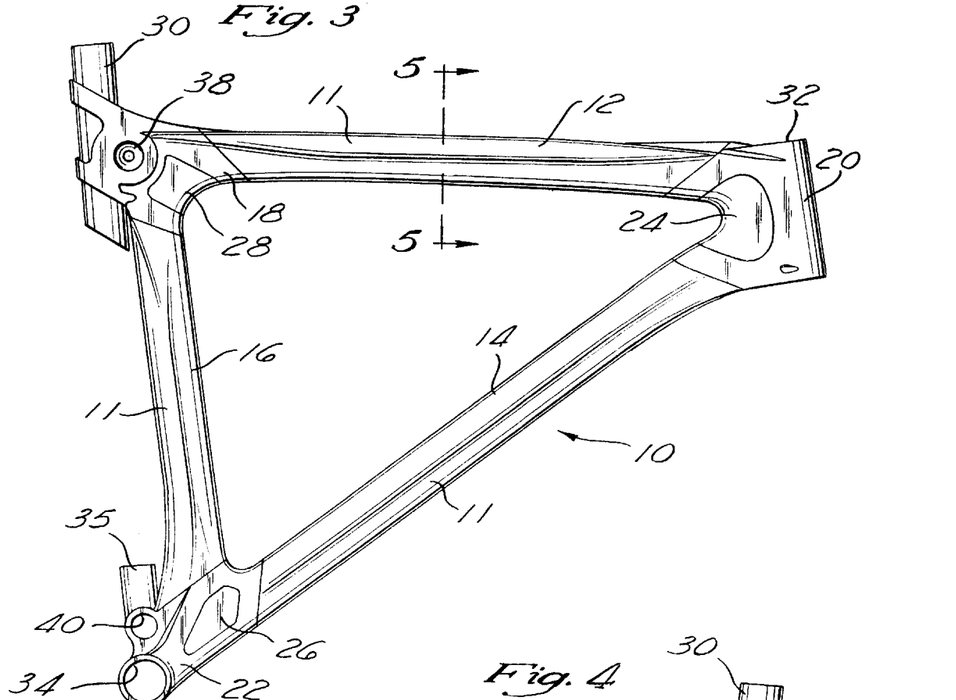
FIG. 3 is a right side-elevational view thereof.
Figures 4, 5:
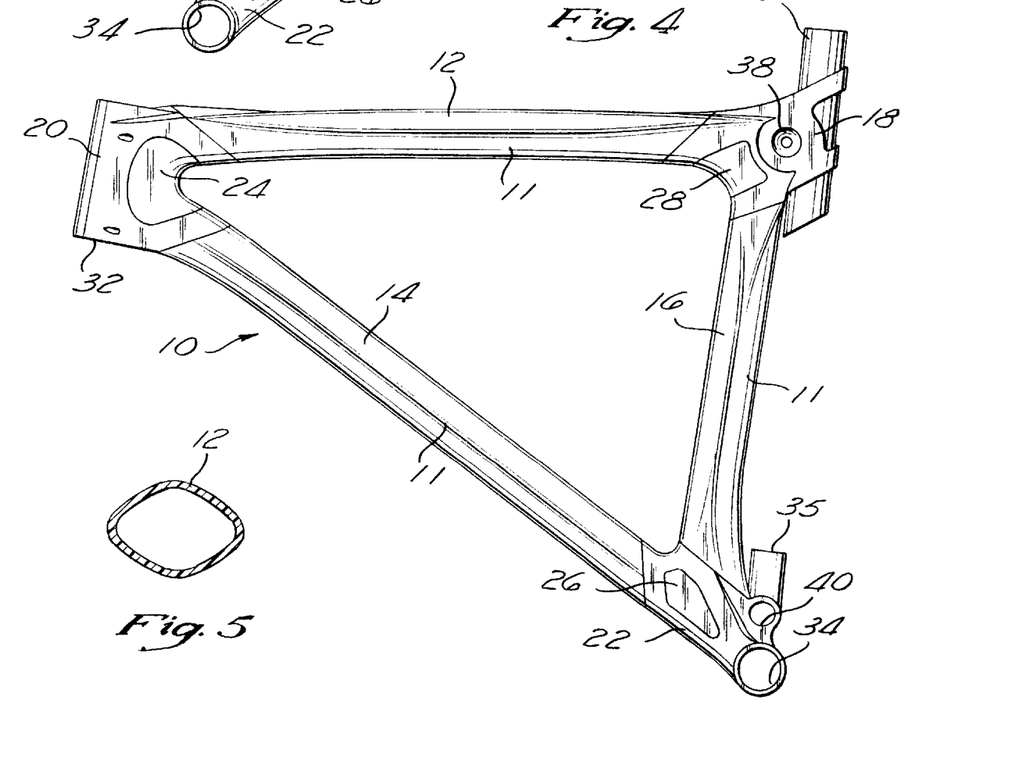
FIG. 4 is a left side-elevational view thereof.
FIG. 5 is a cross-sectional view taken along lines 5—5 of FIG. 3.
Figure 6:
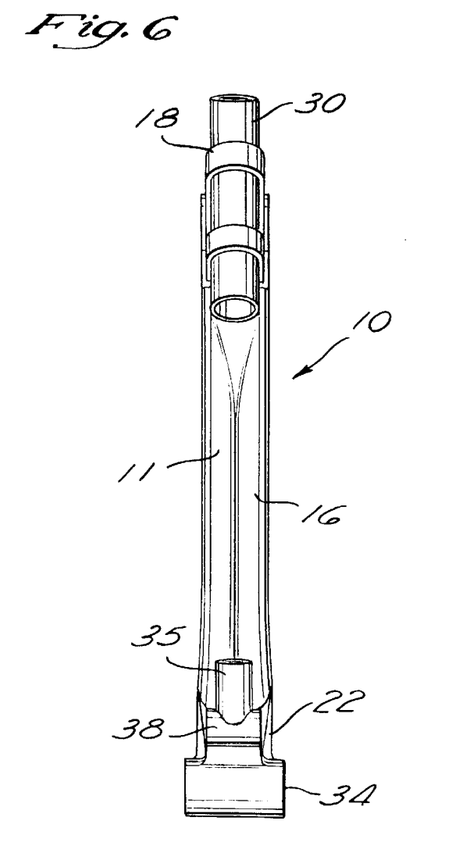
FIG. 6 is a rear elevational view thereof.
Figure 7:
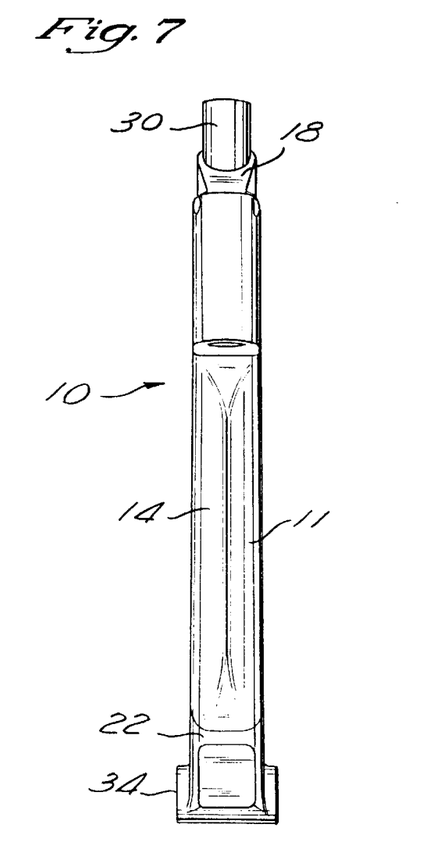
FIG. 7 is a front elevational view thereof.
Figure 8:
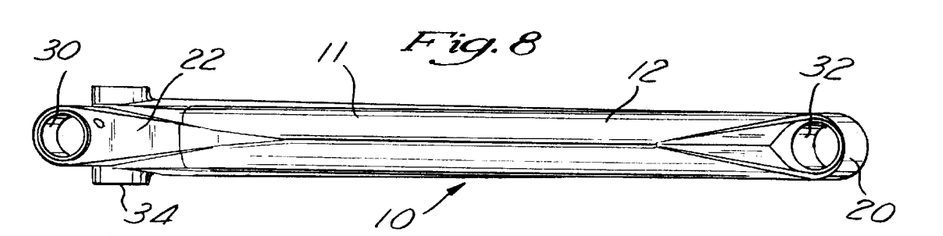
FIG. 8 is a top plan view thereof.
Figure 9:
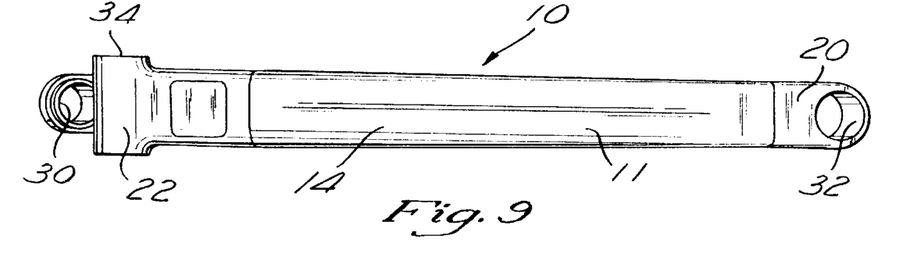
FIG. 9 is a bottom plan view thereof.

The single frame tube 11 which defines the cross bar 12, down tube 14, and the seat tube 16 is generally hollow, as shown by the typical cross section thereof, shown in FIG. 5. The single frame tube 11 is preferably formed of a single section of woven fabric, such as glass fiber, KEVLAR synthetic fiber, or carbon fiber, which is impregnated with a heat curable epoxy resin according to the process described in detail below.

Figure 12:
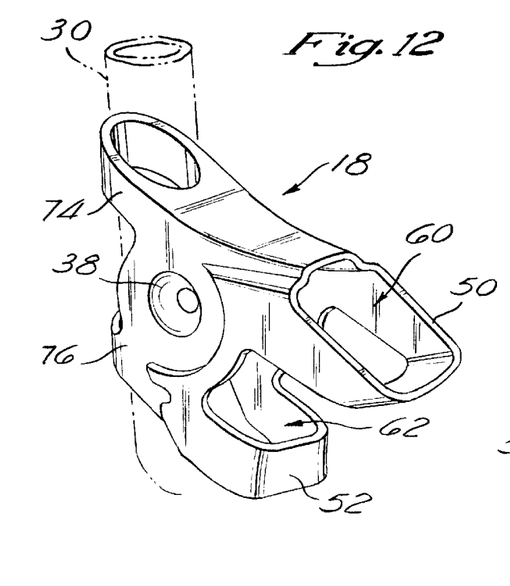
FIG. 12 is a perspective view of the seat tube fitting.

Referring now to FIG. 12, the seat tube fitting 18 preferably comprises an upper seat tube 30 through which the seat stem is slidably disposed so as to adjustably support the bicycle seat. The seat stem preferably does not extend through the seat tube 16, as in contemporary bicycle frames. However, as those skilled in the art will appreciate, the seat stem may alternatively be slidably disposed within the seat tube 16, preferably within a tubular metal insert formed therein, if desired.

The upper seat tube 30 is preferably attached to the seat tube fitting 18 via upper seat tube loop 74 and lower seat tube loop 76 and may be secured therein via welding, adhesive bonding, press fitting, shrink fitting, and/or the use of various fasteners.

The seat tube fitting 18 further comprises an upper loop 50 defining an upper opening 60 which receives the rear end of the cross bar 12 and a lower loop 52 defining a lower opening 62 which receives the upper end of the seat tube 16. Attach point 38 facilitates the attachment of seat stays to the seat tube fitting 18.

Figure 13:
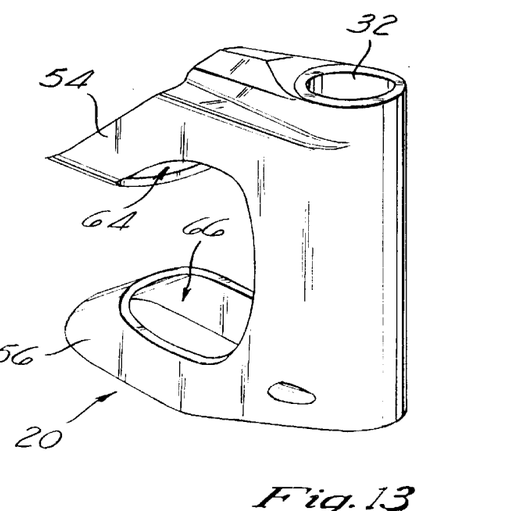
FIG. 13 is a perspective view of the head tube fitting.

Referring now to FIG. 13, the head tube fitting 20 comprises a head tube 32 which rotatably receives the upper end of the forks. The head tube fitting 20 further comprises an upper loop 54 defining an upper opening 64 which receives the forward end of the cross bar 12 and a lower loop 56 which defines a lower opening 66 which receives the forward end of the down tube 14.

Figures 14, 15:
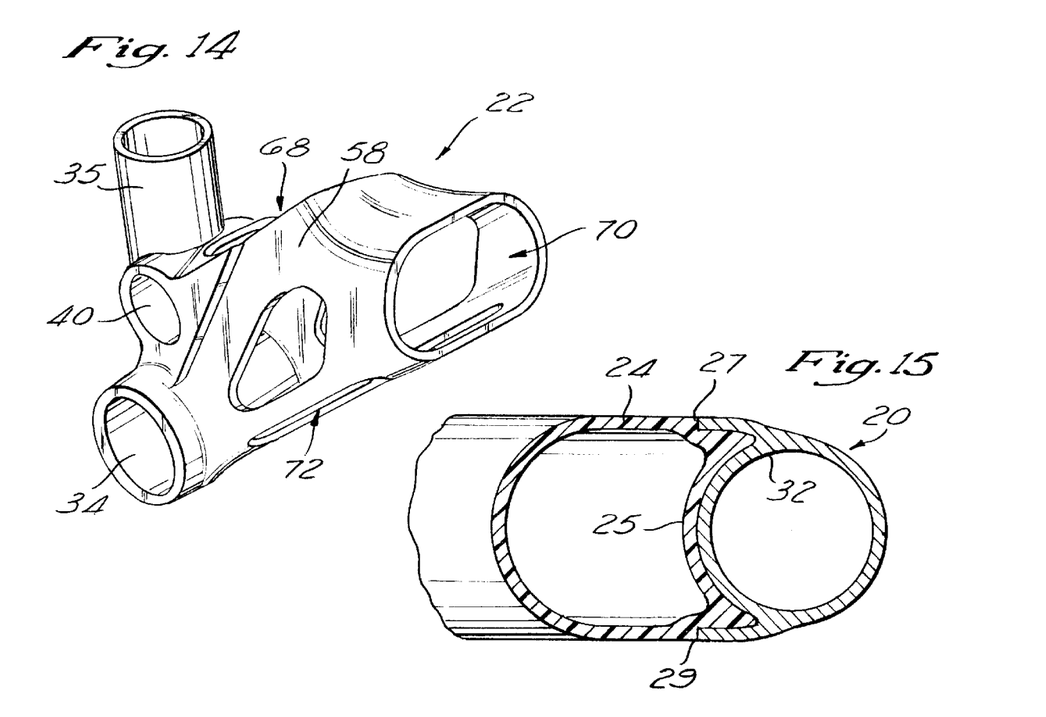
FIG. 14 is a perspective view of the bottom bracket fitting.
FIG. 15 is a cross-sectional fragmentary view taken along lines 15 of FIG. 1.

Referring now to FIG. 14, the bottom bracket fitting 22 comprises a crank tube 34 which rotatably receives the crank. The bottom bracket fitting 22 further comprises a body 58 which defines an upper opening 68 which receives the lower end of the seat tube 16 and a lower opening 70 which receives the rear end of the down tube 14. The body 58 further defines a bottom opening 72 through which the ends of a bladder covered with polymer impregnated fiber extend during the fabrication process, as discussed in detail below. The bottom bracket fitting 22 preferably further comprises a pivot opening 40 for facilitating the attachment of chain stays to the bottom bracket fitting 22. Such chain stays may optionally be pivotally attached to the bottom bracket fitting so as to facilitate the construction of a shock absorbing or soft tail frame.

According to the preferred embodiment of the present invention, the seat tube fitting 18, the head tube fitting 20, and the bottom bracket fitting 22 are integrally formed to the single frame tube 11 in a manner which provides a unitary construction lightweight, high strength, durable bicycle frame.

Referring now to FIG. 15, a further important advantage of the process of the present invention is that surface finishing of the frame is reduced or eliminated since the single frame tube 11 is formed so as to be flush with the outer surfaces of the seat tube fitting 18, head tube fitting 20, and the bottom bracket fitting 22 at the junctions thereof. For example, the junctions 27 and 29 of the head bend 24 portion of the single frame tube 11 with the head tube fitting 20 provide a flush, even, and smooth surface, which is lacking flashing, or other undesirable unevenness, so as to mitigate the requirement for further surface finishing. Additionally, the entire surface of the single frame tube 11, formed according to the present invention, possesses a highly desirable smooth, surface finish. Thus, the substantial and expensive surface finishing steps required according to contemporary construction are substantially eliminated.

Alternatively, the seat tube fitting 18, the head tube fitting 20 and/or the bottom bracket fitting 22 are not integrally formed with the single frame tube 11, but rather are attached thereto after forming the single frame tube 11 to define the cross bar 12, down tube 14, and seat tube 16. Thus, the seat tube fitting 18, head tube fitting 20, and/or the bottom bracket fitting 22 are clamped, adhesively bonded, or otherwise attached to the single frame tube 11.

Further, although a soft tail frame, suitable for use with a shock absorber or motion damping device, is illustrated and described herein, those skilled in the art will appreciate that the method of the present invention may similarly be utilized to fabricate a hard tail bicycle frame which further comprises at least one seat stay member and at least one chain stay member. Indeed, those skilled in the art will appreciate that various configurations of bicycle frames may be fabricated according to the process of the present invention.

Figure 10:
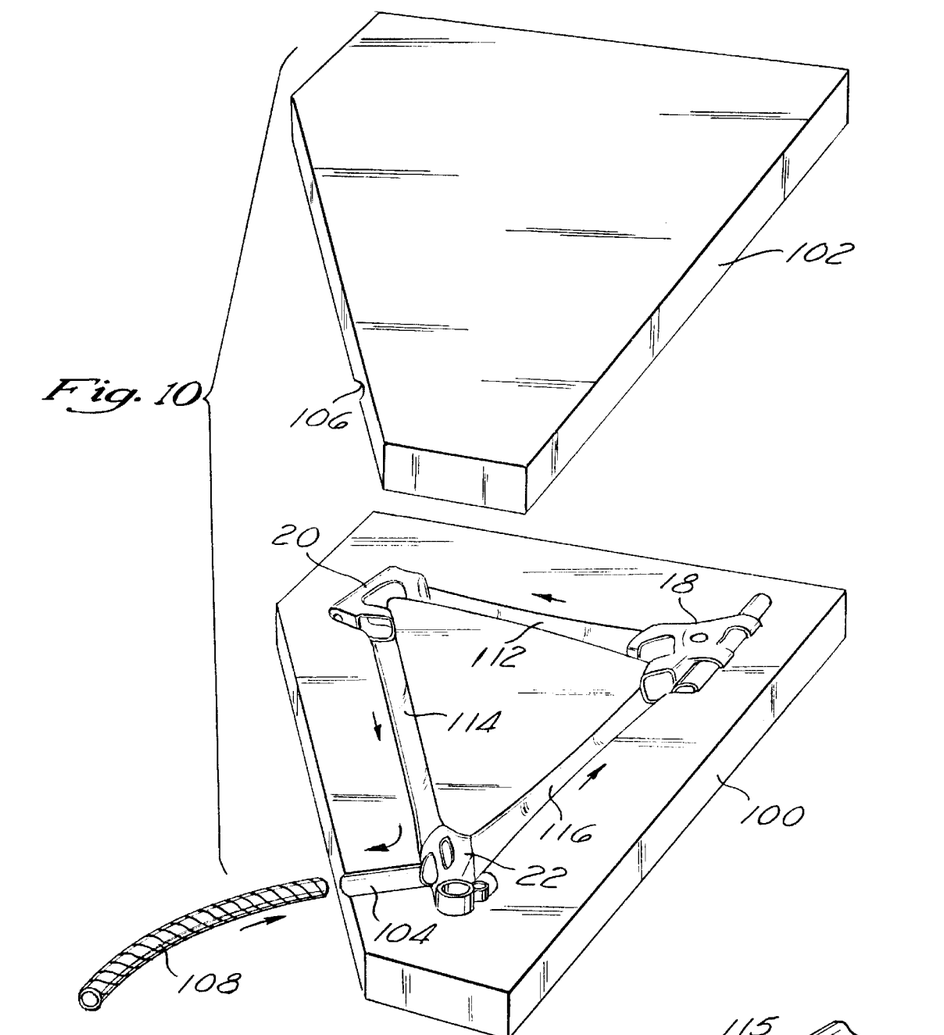
FIG. 10 is a perspective view of the first and second narrowed sections showing the seat tube fitting, head tube fitting, and bottom bracket fitting disposed within the lower or first mold section and also showing the bladder covered with polymer impregnated fiber positioned for threading through openings formed in the seat tube fitting, head tube fitting, and bottom bracket fitting.
Figure 11:
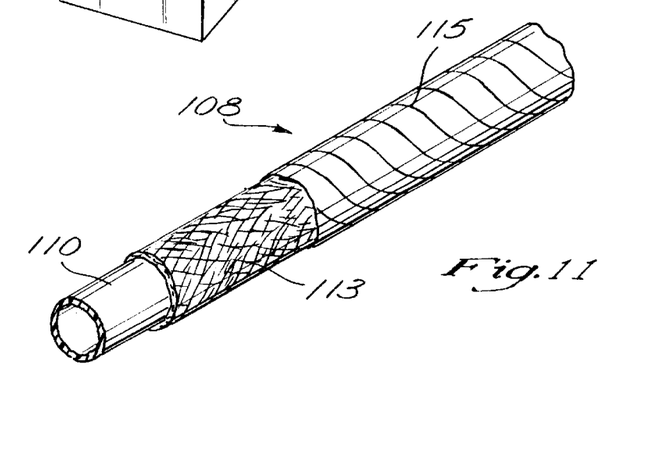
FIG. 11 is a perspective view of the bladder showing the polymer impregnated fiber covering thereof and also showing the nylon sheet wrapped thereabout.

Referring now to FIGS. 10 and 11, the process for forming the bicycle frame of the present invention is described in detail. The seat tube fitting 18, the head tube fitting 20, and the bottom bracket fitting 22 are positioned within a lower mold section 100 which comprises a cross bar groove 112, a down tube groove 114, and a seat tube groove 116 configured so as to form the bicycle frame illustrated in FIGS. 1–15. The upper mold section 102 is generally a mirror image of the lower mold section 100 such that the desired bicycle frame is defined by the cavities formed in the lower mold section 100 and the upper mold section 102.

A section of bladder/composite assembly 108 is snaked or threaded through the bottom bracket fitting 22, the seat tube fitting 18, and the head tube fitting 20, preferably such that the two ends of the bladder/composite assembly 108 extend out through the exit groove defined by the lower exit groove 104 formed in the lower mold section 100 and the upper exit groove 106 formed in the upper mold section 102.

After the bladder/composite assembly 108 has been threaded through the bottom bracket fitting 22, seat tube fitting 18, and the head tube fitting 20, and is properly positioned within the cross bar groove 112, down tube groove 114, and the seat tube groove 116, then the upper mold section 102 is mated to the lower mold section 100 and the bladder/composite assembly 108 is heated, preferably by heating the lower mold section 100 and the upper mold section 102, while simultaneously pressurizing the bladder/composite assembly 108, preferably with air pressure applied thereto.

The bladder/composite assembly 108 is preferably pressurized by inserting a plug into one end thereof and inserting a pressurized air hose, typically via a plug having an opening formed therein, into the other end thereof. Alternatively, the bladder/composite assembly 108 may be heated and pressurized by causing a heated fluid, i.e., hot water, steam, etc., to flow therethrough. The use of such fluid heating eliminates the need to heat the lower 100 and upper 102 mold sections, thereby allowing thicker coating of the molded assembly. Cooling may further be facilitated by causing a cooled fluid, i.e., air or water, to flow through the bladder/composite assembly 108. Conventional water cooling of the lower 100 and upper 102 mold sections may also be utilized.

Pressurizing and heating the bladder/composite assembly 108 causes the bladder to expand the polymer impregnated composite material formed thereabout such that it conforms to the shape of the cross bar groove 112, down tube groove 114, and seat tube groove 116 and such that it conforms to the inner surfaces of the sheet tube fitting 118, head tube fitting 20, and bottom bracket fitting 22. Thus, a fiber reinforced polymer composite is formed during the heating process, according to well known principles. The excess portions of the fiber reinforced polymer composite, which extend out through the bottom opening 72 of the bottom bracket fitting 22 cut off and may optionally be finished, i.e., sanded and/or polished, to clean appearance.

With particular reference to FIG. 11, the bladder/composite assembly 108 comprises an expandable bladder 110, formed of a temperature resistant, resilient material such as silicone, which is covered with a polymer impregnated fiber weave 113, which is preferably in the form of a sheet of woven fiber impregnated polymer material which is wrapped about the bladder 110. The woven fiber material preferably comprises fiberglass, KEVLAR synthetic fiber, and/or carbon fibers. Preferably, a single, continuous sheet of polymer impregnated fiber weave 113 is utilized so as to optimize the strength of the final assembly.

According to the preferred embodiment of the present invention, a layer of transparent nylon wrapping 115 is formed over the polymer impregnated fiber weave 113. The nylon wrapping 115 melts during the molding process so as to provide a substantially clear and durable coating which adds depth to the surface finish of the bicycle frame and which allows viewing of the weave of the resulting fiber reinforced polymer composite therethrough in an aesthetically desirable manner.

It is understood that the exemplary bicycle frame described herein and shown in the drawings represents only a presently preferred embodiment of the invention. Indeed, various modifications and additions may be made to such embodiment without departing from the spirit and scope of the invention. Various different configurations of the frame are contemplated. For example, by increasing the structural strength of any two of the elongate members of the bicycle frame, i.e., the cross bar 12, the down tube 14, and the seat tube 16, the third elongate member may be eliminated. Additionally, at least one seat stay member and at least chain stay member may be formed according to the present process. Further, as those skilled in the art will appreciate, various different fabrics and/or polymer materials are likewise suitable for use in the practice of the present invention. Thus, these and other modifications and additions may be obvious to those skilled in the art and may be implemented to adapt the present invention for use in a variety of different applications.

What is claimed is:

1. A bicycle frame comprising:
   a) a frame tube formed from a single, continuous section of polymer impregnated fiber material;
   b) a seat tube fitting attached to said frame tube; and
   c) a bottom bracket fitting attached to said frame tube.

2. The bicycle frame as recited in claim 1 further comprising a head tube fitting attached to said frame tube.

3. The bicycle frame as recited in claim 1 wherein said frame tube defines a soft tail frame.

4. The bicycle frame as recited in claim 3 wherein said frame tube defines a crossbar portion, a down tube portion, and a seat tube portion.

5. The bicycle frame as recited in claim 2 wherein:
   said seat tube fitting is configured to facilitate the slidable attachment of a seat thereto;
   said head tube fitting is configured to facilitate the rotatable attachment of a handle bar stem thereto; and
   said bottom bracket fitting is configured to facilitate the rotatable attachment of a crankshaft thereto.

6. The bicycle frame as recited in claim 2 wherein said seat tube fitting, said head tube fitting, and said bottom bracket fitting are each removably attached to said frame tube.

7. The bicycle frame as recited in claim 2 wherein said seat tube fitting, said head tube fitting, and said bottom bracket fitting are each integrally connected to said frame tube.

8. The bicycle frame as recited in claim 1 wherein said frame tube is formed from a thermoplastic impregnated fiber material.

9. The bicycle frame as recited in claim 1 wherein said frame tube is formed from a polymer impregnated carbon fiber material.

10. The bicycle frame as recited in claim 1 wherein said fiber material comprises a sheet of interwoven fiber material.

11. The bicycle frame as recited in claim 1 wherein said frame tube comprises an outer layer of nylon.

12. A method for forming a soft tail bicycle frame, said method comprising the steps of:
   a) placing a head tube fitting, a seat tube fitting and a bottom bracket fitting within a first mold section of a mold; and
   b) forming a continuous frame tube which defines a crossbar portion, a down tube portion, and a seat tube portion from a fiber reinforced polymer composite such that the bicycle frame is generally defined thereby, said frame tube being formed within the mold such that the head tube fitting, seat tube fitting, and the bottom bracket fitting are integrally connected thereto; said forming step comprising:
      (i) extending a bladder covered with a polymer impregnated fiber material through the seat tube fitting, the head tube fitting, and the bottom bracket fitting within the first mold section;
      (ii) mating a second mold section of the mold to the first mold section such that a cavity generally defining a desired frame shape is defined therebetween;
      (iii) heating the polymer impregnated fiber material; and (iv) inflating the bladder so as to cause the polymer impregnated fiber material to generally conform to the shape of the cavity.

13. The method as recited in claim 12 wherein step (i) comprises extending a bladder covered with a polymer impregnated fiber material having a nylon wrap applied thereto through the seat tube fitting, the head tube fitting, and the bottom bracket fitting.

14. The method as recited in claim 12 wherein step (iii) comprises heating the first and second mold sections.

15. The method as recited in claim 12 further comprising the step of:

v) cooling the first and second mold sections subsequent to inflating the bladder.

16. The method as recited in claim 12 wherein the bladder defines opposed ends, and step (i) comprises extending the bladder through the seat tube fitting, the head tube fitting, and the bottom bracket fitting such that the opposed ends thereof protrude from a single port within the first mold section.

17. The method as recited in claim 12 wherein steps (iii) and (iv) are simultaneously conducted.

18. A method for forming a bicycle frame, said method comprising the steps of:

a) forming a frame tube from a single, continuous section of polymer impregnated fiber material; and b) attaching a seat tube fitting and a bottom bracket fitting to the frame tube.

19. A method for forming a bicycle frame, said method comprising the steps of:

a) placing a seat tube fitting and a bottom bracket fitting into a mold; and b) forming a frame tube within the mold from a single, continuous section of polymer impregnated fiber material such that the seat tube fitting and the bottom bracket fitting are integrally connected thereto and the bicycle frame is generally defined thereby.

* * * * *